US011550100B2

(12) United States Patent
Bian et al.

(10) Patent No.: US 11,550,100 B2
(45) Date of Patent: Jan. 10, 2023

(54) WAVELENGTH-DIVISION MULTIPLEXING FILTERS INCLUDING ASSISTED COUPLING REGIONS

(71) Applicants: GLOBALFOUNDRIES U.S. Inc., Santa Clara, CA (US); KHALIFA UNIVERSITY OF SCIENCE AND TECHNOLOGY, Abu Dhabi (AE)

(72) Inventors: Yusheng Bian, Ballston Lake, NY (US); Michal Rakowski, Ballston Lake, NY (US); Roderick A. Augur, Saratoga Springs, NY (US); Marios Papadovasilakis, Dubai (AE); Sujith Chandran, Abu Dhabi (AE); Jaime Viegas, Abu Dhabi (AE); Yonas Gebregiorgis, Abu Dhabi (AE)

(73) Assignees: GlobalFoundries U.S. Inc., Santa Clara, CA (US); Khalifa University of Science and Technology, Abu Dhabi (AE)

( * ) Notice: Subject to any disclaimer, the term of this patent is extended or adjusted under 35 U.S.C. 154(b) by 94 days.

(21) Appl. No.: 17/202,729

(22) Filed: Mar. 16, 2021

(65) Prior Publication Data
US 2022/0299706 A1 Sep. 22, 2022

(51) Int. Cl.
*G02B 6/10* (2006.01)
*G02B 6/12* (2006.01)
(Continued)

(52) U.S. Cl.
CPC ......... *G02B 6/12007* (2013.01); *G02B 6/125* (2013.01); *G02B 6/1228* (2013.01); *G02B 6/13* (2013.01); *G02B 2006/12061* (2013.01)

(58) Field of Classification Search
CPC .. G02B 6/12007; G02B 6/1228; G02B 6/125; G02B 6/13; G02B 2006/12061
(Continued)

(56) References Cited

U.S. PATENT DOCUMENTS

| 7,356,221 B2 | 4/2008 | Chu et al. | |
| 7,848,602 B2 * | 12/2010 | Kim | G02B 6/12011 385/32 |

(Continued)

OTHER PUBLICATIONS

Bian, et al., "Towards low-loss monolithic silicon and nitride photonic building blocks in state-of-the-art 300mm CMOS foundry," in Frontiers in Optics / Laser Science, OSA Technical Digest (Optical Society of America, 2020), paper FW5D.2.
(Continued)

*Primary Examiner* — Kaveh C Kianni
*Assistant Examiner* — Hung Q Lam
(74) *Attorney, Agent, or Firm* — Thompson Hine LLP; Anthony Canale

(57) ABSTRACT

Structures for a wavelength-division multiplexing filter and methods of forming a structure for a wavelength-division multiplexing filter. A waveguide core of the wavelength-division multiplexing filter includes a first bend having a first curvature and a second bend having a second curvature different than the first curvature. The structure further includes a waveguide core region having a first end surface, a second end surface, and a bend arranged between the first and second end surfaces. The bend is positioned over the first bend of the waveguide core in an overlapping relationship.

20 Claims, 9 Drawing Sheets

(51) Int. Cl.
  *G02B 6/26* (2006.01)
  *G02B 6/42* (2006.01)
  *G02B 6/125* (2006.01)
  *G02B 6/13* (2006.01)
  *G02B 6/122* (2006.01)

(58) Field of Classification Search
  USPC .. 385/14, 27, 28, 30–32, 39, 42, 43, 45, 47, 385/132
  See application file for complete search history.

(56) References Cited

U.S. PATENT DOCUMENTS

| | | | |
|---|---|---|---|
| 10,436,982 B1 * | 10/2019 | Bian | G02B 6/13 |
| 10,942,321 B1 | 3/2021 | Chandran et al. | |
| 2009/0103863 A1 | 4/2009 | Lee et al. | |
| 2020/0012045 A1 * | 1/2020 | Bian | G02B 6/1228 |

OTHER PUBLICATIONS

Alec Hammond et al., "Perforated Wavelength-Division Multiplexing Filters", filed Feb. 8, 2021 as U.S. Appl. No. 17/170,203.

Ong, et al., "Ultra-High-Contrast and Tunable-Bandwidth Filter Using Cascaded High-Order Silicon Microring Filters," in IEEE Photonics Technology Letters, vol. 25, No. 16, pp. 1543-1546, Aug. 15, 2013.

T. Yen and Y. Hung, "Fabrication-Insensitive CWDM (De)Multiplexer based on Cascaded Mach-Zehnder Interferometers," 2020 Optical Fiber Communications Conference and Exhibition (OFC), San Diego, CA, USA, 2020, pp. 1-3.

Horst, et al., "Cascaded Mach-Zehnder wavelength filters in silicon photonics for low loss and flat pass-band WDM (de-)multiplexing," Opt. Express 21, 11652-11658 (2013).

Huffman, et al., "Integrated Resonators in an Ultralow Loss Si3N4/SiO2 Platform for Multifunction Applications," in IEEE Journal of Selected Topics in Quantum Electronics, vol. 24, No. 4, pp. 1-9, Jul.-Aug. 2018, Art No. 5900209.

Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Gao, et al., "Silicon nitride O-band (de)multiplexers with low thermal sensitivity," Opt. Express 25, 12260-12267 (2017).

Tao, et al., "Athermal silicon nitride 4-channel (de-)multiplexer based on cascaded MZIs," in International Photonics and OptoElectronics Meeting 2019 (OFDA, OEDI, ISST, PE LST, TSA), OSA Technical Digest (Optical Society of America, 2019), paper JW4A.63.

S. Assefa et al., "A 90nm CMOS integrated Nano-Photonics technology for 25Gbps WDM optical communications applications," 2012 International Electron Devices Meeting, San Francisco, CA, USA, 2012, pp. 33.8.1-33.8.3, doi: 10.1109/IEDM.2012.6479162.

Dwivedi, et al., "Coarse wavelength division multiplexer on silicon-on-insulator for 100 GbE," 2015 IEEE 12th International Conference on Group IV Photonics (GFP), Vancouver, BC, Canada, 2015, pp. 9-10.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Yang, et al., "Silicon nitride three-mode division multiplexing and wavelength-division multiplexing using asymmetrical directional couplers and microring resonators," Opt. Express 22, 22172-22183 (2014).

* cited by examiner

WAVELENGTH-DIVISION MULTIPLEXING FILTERS INCLUDING ASSISTED COUPLING REGIONS

BACKGROUND

The present invention relates to photonics chips and, more specifically, to structures for a wavelength-division multiplexing filter and methods of forming a structure for a wavelength-division multiplexing filter.

Photonics chips are used in numerous applications, such as data communication systems and data computation systems. A photonics chip monolithically integrates optical components, such as waveguides, optical switches, couplers, and modulators, and electronic components, such as field-effect transistors, into a unified platform. Among other factors, layout area, cost, and operational overhead may be reduced by the chip-level integration of both types of components on the same chip.

Wavelength-division multiplexing is a technology that multiplexes multiple data streams onto a single optical link. In a wavelength-division multiplexing scheme, a set of data streams is encoded onto optical carrier signals with a different wavelength of laser light for each data stream. These optical carrier signals of the individual data streams are then combined by a wavelength-division multiplexing filter, which has a dedicated input for the data stream of each wavelength and a single output at which the individual data streams are combined (i.e., multiplexed) into a single multi-wavelength data stream for further transport through a single optical link. At the receiver side of the optical data link, a wavelength-division multiplexing filter of the same type, but used in reverse, separates (i.e., de-multiplexes) the optical carrier signals of the individual data streams and the separated optical carrier signals may be routed to corresponding photodetectors.

A wavelength-division multiplexing filter may rely on cascaded Mach-Zehnder interferometers (MZIs) that are realized in a silicon-based photonics technology. Because silicon exhibits a weak electro-optic effect, Mach-Zehnder interferometers are characterized by a large form factor having lengthy silicon-based phase shifters that are arranged in dual arms. Mach-Zehnder interferometers suffer from linewidth variation and spectral offsets arising from cross-sectional variations at different locations along the arms. Mach—Zehnder interferometers are also characterized by optical power splitting ratios that are wavelength dependent.

Wavelength-division multiplexing filters fabricated from silicon are sensitive to temperature drift due to the relatively high thermal optical coefficient of silicon, which may result in phase error. Resistive heaters may be used to provide thermal tuning that is intended to compensate for the temperature shift. However, the addition of resistive heaters adds complexity to chip fabrication, as well as adding complexity to operational overhead because of the need to control the operation of the resistive heaters. In addition, the resistive heaters require the dissipation of significant amounts of electrical power to provide the requisite heating for temperature shift control.

Improved structures for a wavelength-division multiplexing filter and methods of forming a structure for a wavelength-division multiplexing filter are needed.

SUMMARY

In an embodiment of the invention, a structure for a wavelength-division multiplexing filter is provided. The structure includes a waveguide core having a first bend with a first curvature and a second bend with a second curvature different than the first curvature. The structure further includes a waveguide core region having a first end surface, a second end surface, and a bend arranged between the first end surface and the second end surface. The bend is positioned over the first bend of the waveguide core in an overlapping relationship.

In an embodiment of the invention, a method of forming a structure for a wavelength-division multiplexing filter is provided. The method includes forming a waveguide core including a first bend with a first curvature and a second bend with a second curvature different than the first curvature, and forming a waveguide core region including a first end surface, a second end surface, and a bend arranged between the first end surface and the second end surface. The bend is positioned over the first bend of the first waveguide core in an overlapping relationship.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
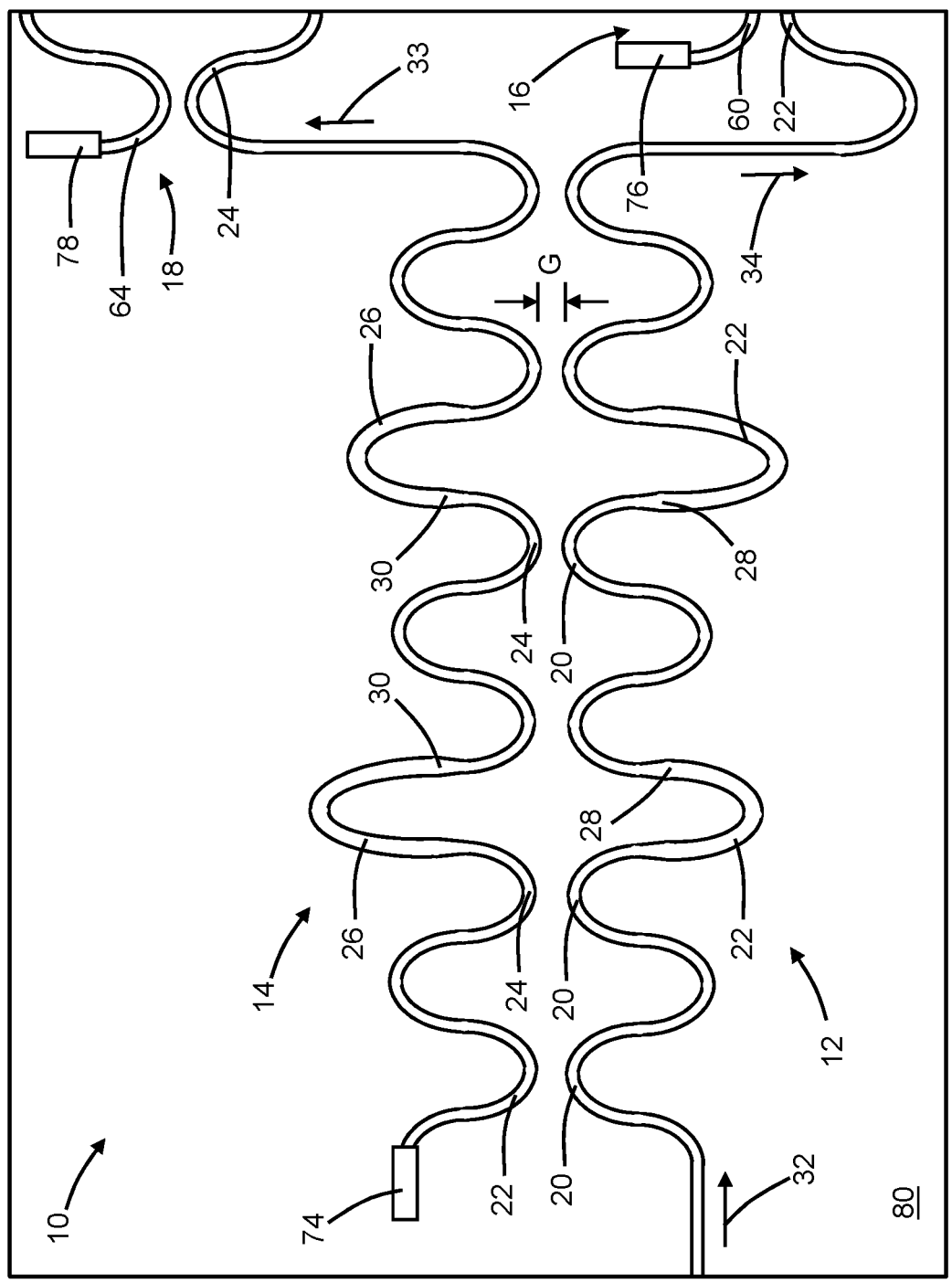
FIG. 1 is a top view of a structure at an initial fabrication stage of a processing method in accordance with embodiments of the invention.
Figure 2:
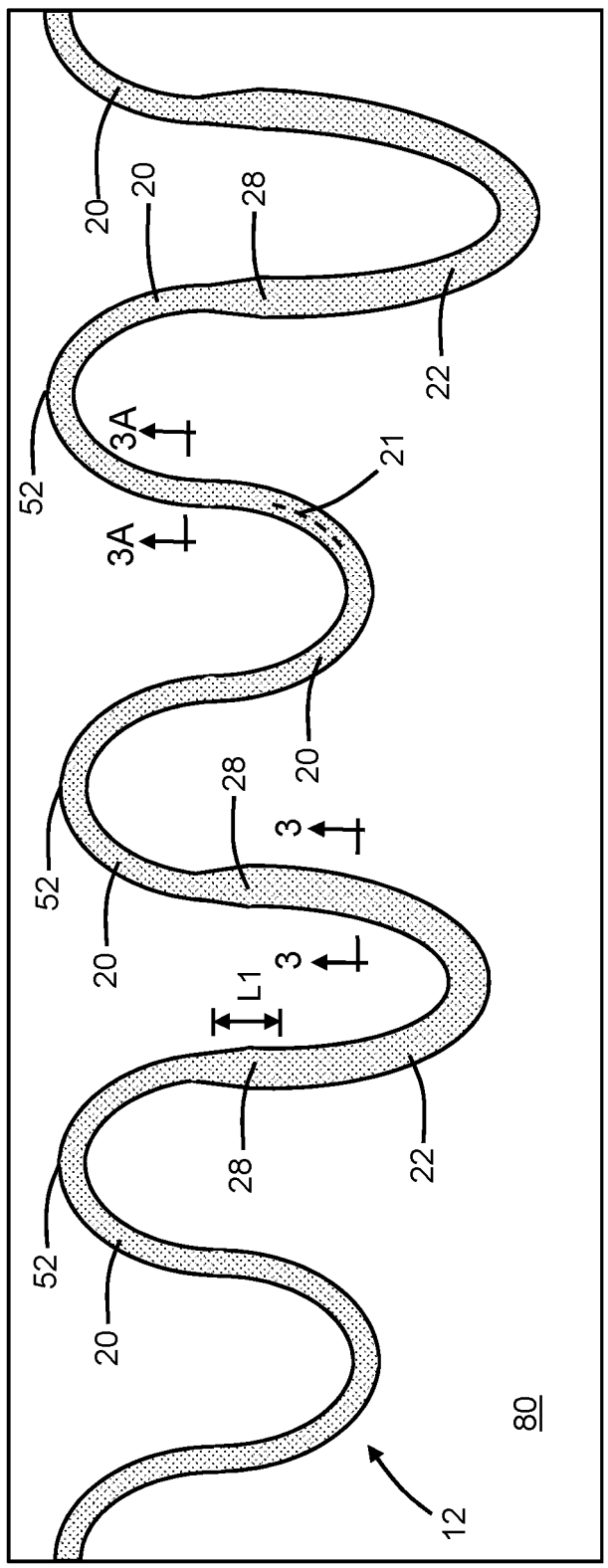
FIG. 2 is an enlarged top view of a portion of the structure of FIG. 1.
Figure 3:
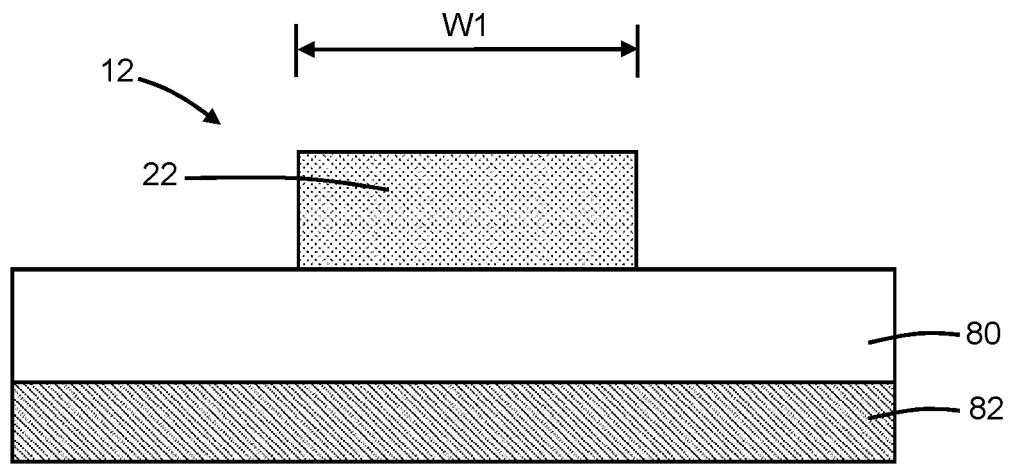
FIG. 3 is a cross-sectional view taken generally along line 3-3 in FIG. 2.
Figure 3A:
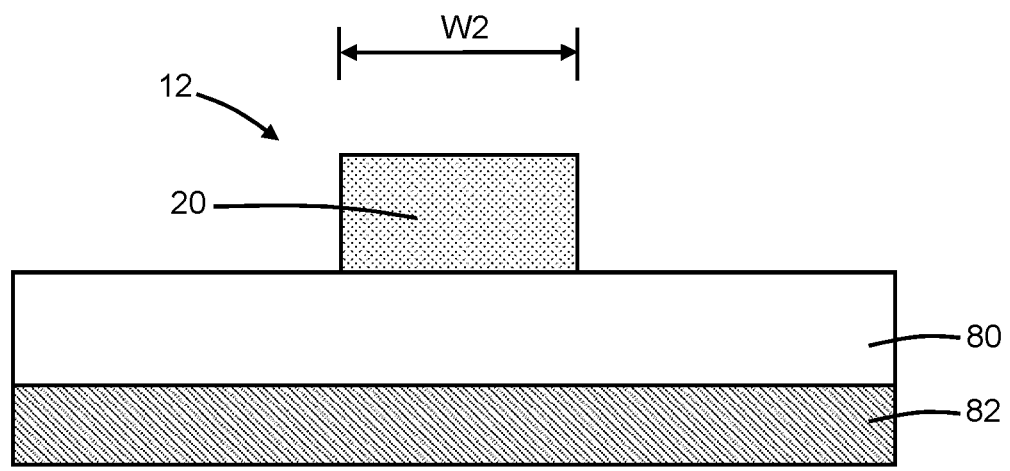
FIG. 3A is a cross-sectional view taken generally along line 3A-3A in FIG. 2.
Figure 4:
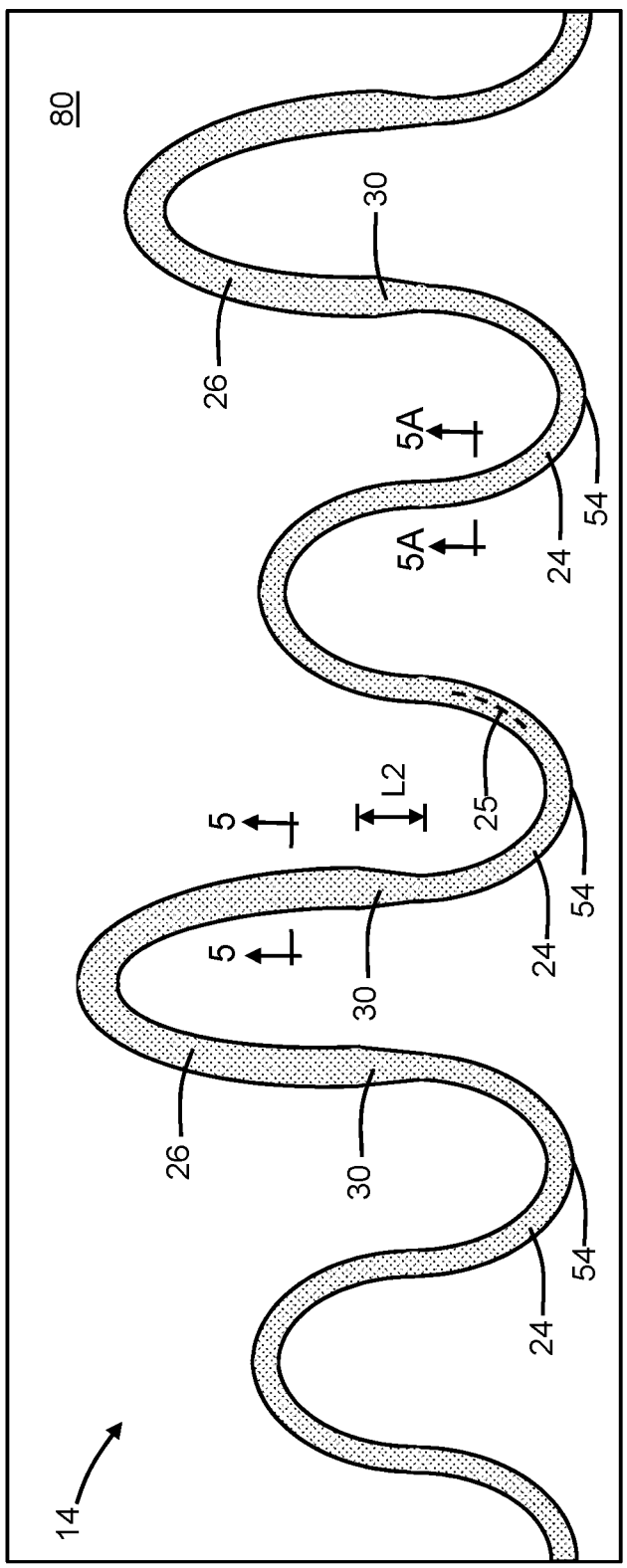
FIG. 4 is an enlarged top view of a portion of the structure of FIG. 1.
Figure 5:
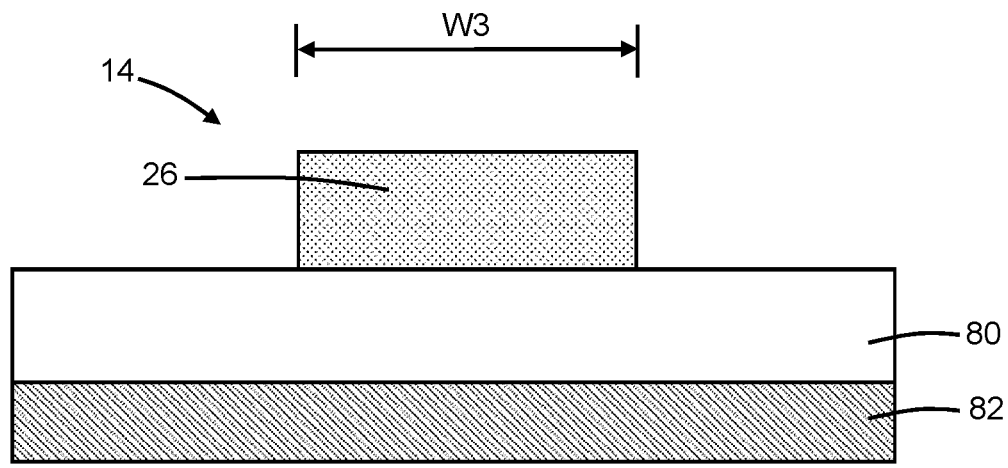
FIG. 5 is a cross-sectional view taken generally along line 5-5 in FIG. 4.
Figure 5A:
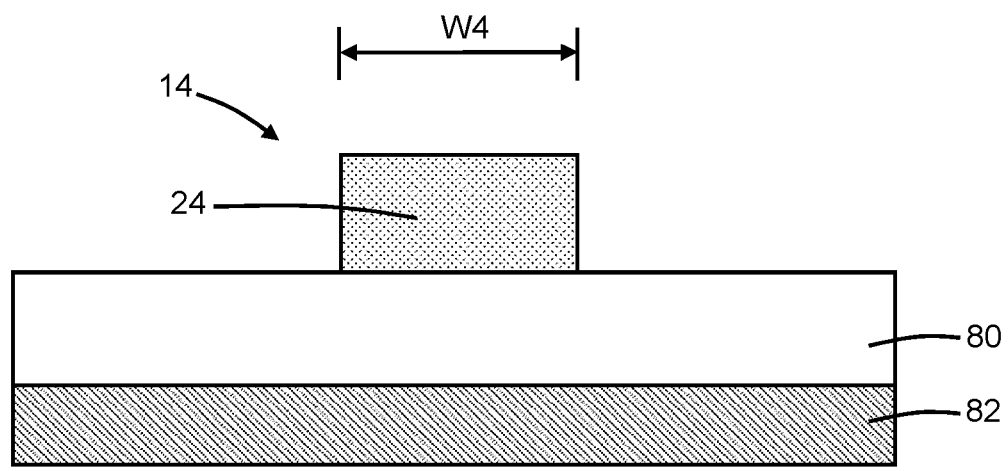
FIG. 5A is a cross-sectional view taken generally along line 5A-5A in FIG. 4.
Figure 6:
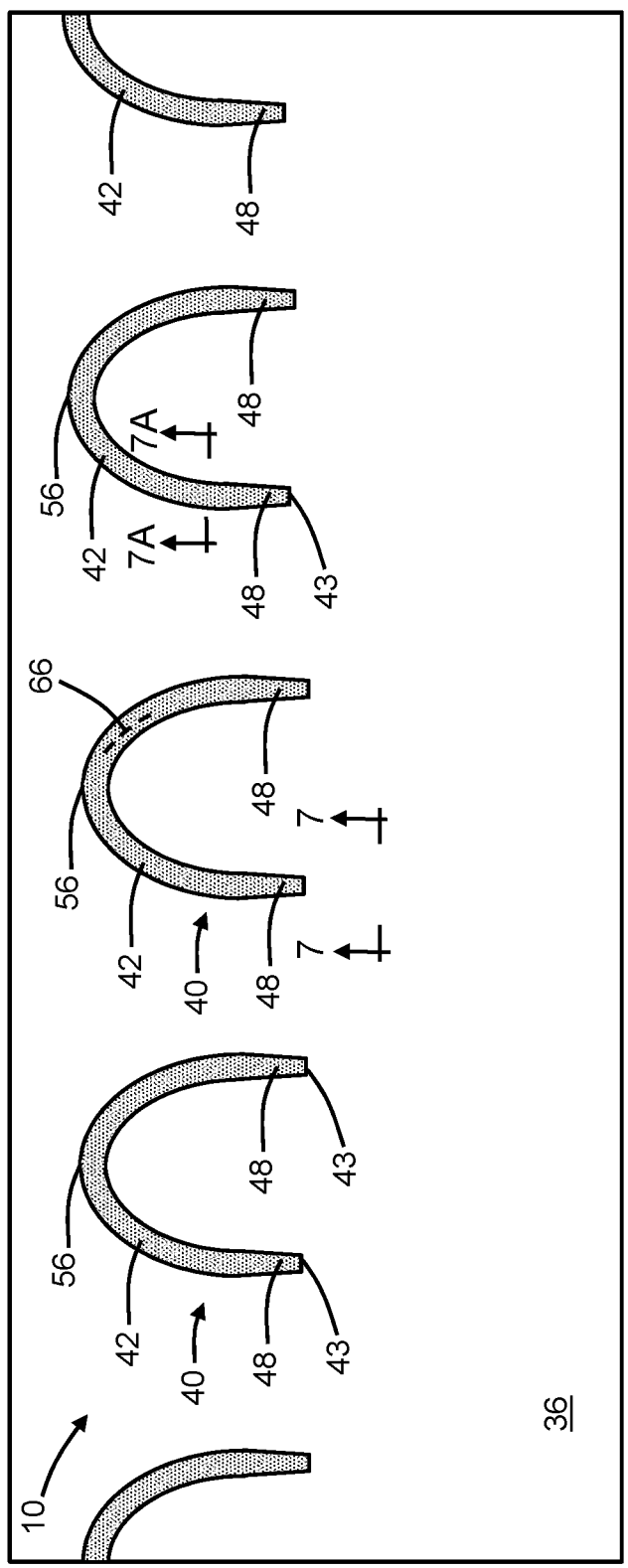
FIGS. 6 and 8 are top views of the structure of FIGS. 2 and 4, respectively, at a fabrication stage subsequent to FIG. 1.
Figure 7:
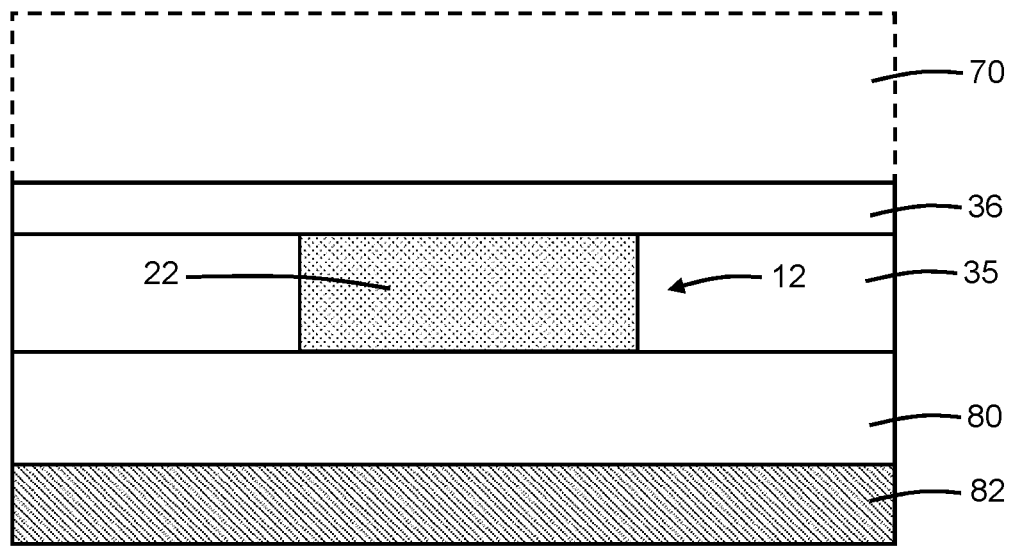
FIG. 7 is a cross-sectional view of the structure taken generally along line 7-7 in FIG. 6.
Figure 7A:
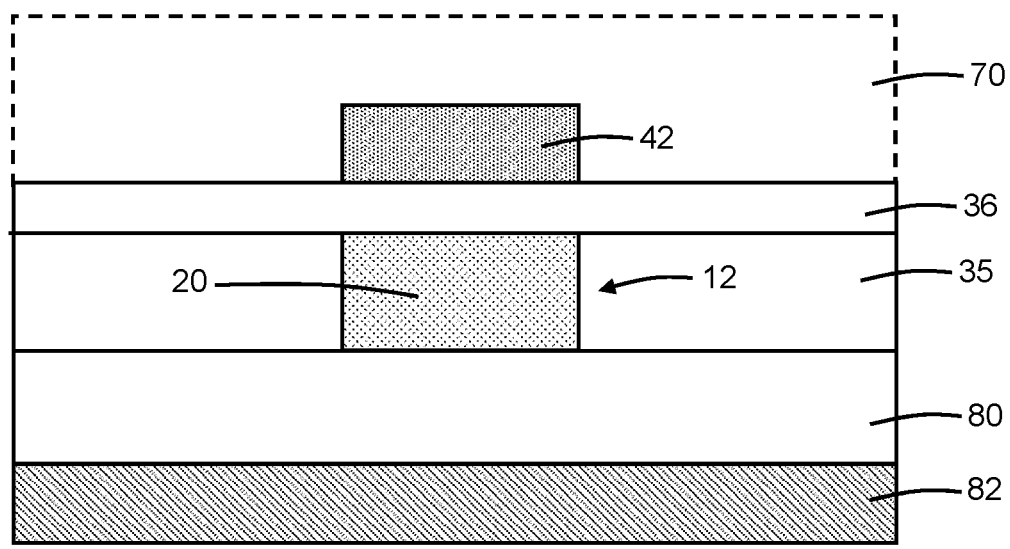
FIG. 7A is a cross-sectional view of the structure taken generally along line 7A-7A in FIG. 6.
Figure 8:
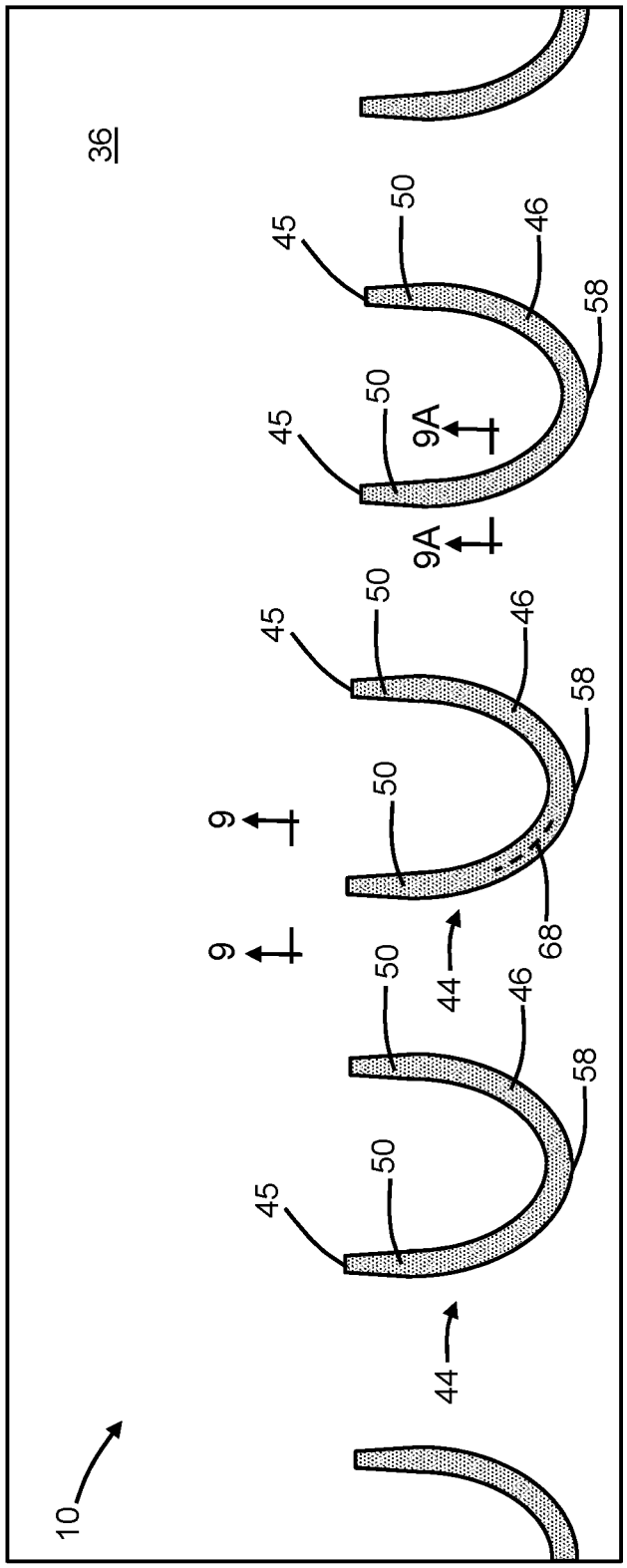
Figure 9:
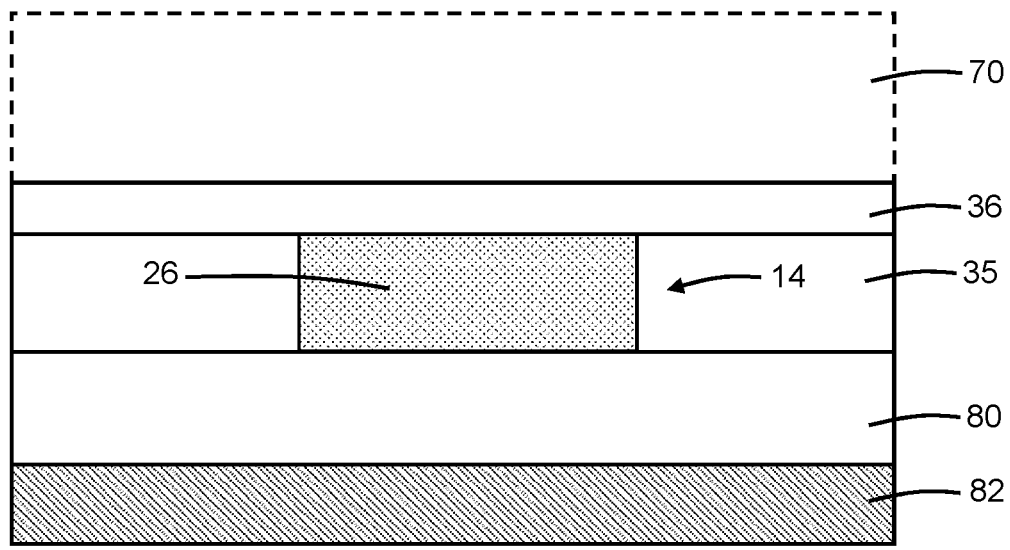
FIG. 9 is a cross-sectional view of the structure taken generally along line 9-9 in FIG. 8.
Figure 9A:
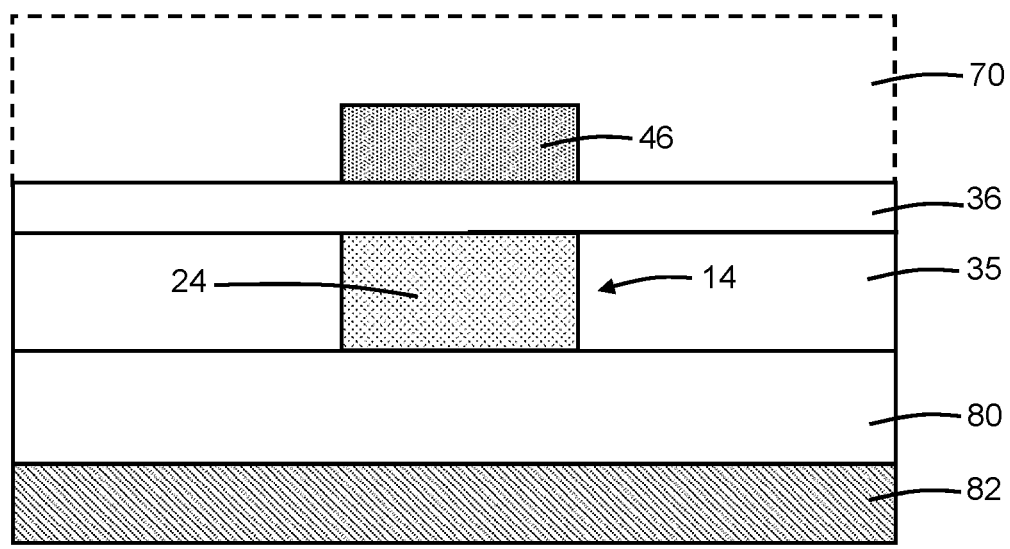
FIG. 9A is a cross-sectional view of the structure taken generally along line 9A-9A in FIG. 8.

With reference to FIGS. 1, 2, 3, 3A, 4, 5, 5A and in accordance with embodiments of the invention, a structure 10 for a wavelength-division multiplexing filter includes waveguide cores 12, 14, 16, 18 that are positioned over a dielectric layer 80. The waveguide cores 12, 14, 16, 18 provide arms of the structure 10 that are routed in curved paths within the layout of the structure 10. The waveguide core 12 may provide an input of a de-multiplexing filter to the structure 10, and the undulations of the arms defined by the waveguide cores 12, 14 are synchronized to provide an initial stage of the structure 10. The portion of the waveguide core 12 participating in the initial stage supplies an input from the initial stage to a subsequent stage of the structure 10 that further includes a portion of the waveguide core 16. The portion of the waveguide core 14 participating in the initial stage supplies an input from the initial stage to another subsequent stage of the structure 10 that further includes a portion of the waveguide core 18. The portion of the waveguide core 14 participating in the initial stage of the structure 10 is terminated at one end by an optical terminator 74. Similarly, the portions of the waveguide cores 16, 18 participating in the subsequent stages of the structure 10 are terminated at one end by respective optical terminators 76, 78. The initial stage is connected to the subsequent stages in a cascaded matter. Alternatively, the structure 10 may be configured such that the initial and subsequent stages are reversed to multiplex the optical carrier signals instead of demultiplexing optical carrier signals.

The waveguide cores 12, 14, 16, 18 may be comprised of a high refractive-index material. In an embodiment, the waveguide cores 12, 14, 16, 18 may be comprised of a material having a refractive index in a range of three (3) to four (4). In an embodiment, the waveguide cores 12, 14, 16, 18 may be comprised of a single-crystal semiconductor material, such as single-crystal silicon patterned by lithography and etching processes from a device layer of a silicon-on-insulator (SOI) substrate. The silicon-on-insulator substrate further includes a buried insulator layer comprised of a dielectric material, such as silicon dioxide, that provides the dielectric layer 80 and a handle substrate 82 comprised of a single-crystal semiconductor material, such as single-crystal silicon, beneath the buried insulator layer.

The waveguide core 12 includes bends 20, 22 representing curved segments that are adjoined and connected in a continuous manner along a longitudinal axis 21 that changes in direction with the changing curvature of the bends 20, 22. The waveguide core 14 includes bends 24, 26 representing curved segments that are adjoined and connected in a continuous manner along a longitudinal axis 25 that changes in direction with the changing curvature of the bends 24, 26. The bends 20 of the waveguide core 12 and the bends 24 of the waveguide core 14 are paired to provide directional coupling regions of the structure 10. More specifically, the bends 20 of the waveguide core 12 are routed to approach the bends 24 of the waveguide core 14 with a proximity that permits optical coupling, which may be wavelength independent. The bends 22 of the waveguide core 12 and the bends 26 of the waveguide core 14, which are also paired in a complementary manner, provide wavelength separation regions of the structure 10. In particular, the bends 22 of the waveguide core 12 and the bends 26 of the waveguide core 14 separate different frequency/wavelength components of input optical signals with multiple wavelengths by generating suitable phase-shifts and free-spectral ranges.

The bends 20 and bends 22 are arranged along the longitudinal axis 21 of the waveguide core 12, and the bends 24 and bends 26 are arranged along the longitudinal axis 25 of the waveguide core 14. The bends 20 have a different curvature than the bends 22 and, similarly, the bends 24 have a different curvature than the bends 26. Each of the bends 20, 22 may extend over an arc length of 180° and therefore may each change the propagation direction of the optical signals in the waveguide core 12 by 180°. Each of the bends 24, 26 may extend over an arc length of 180° and therefore may each change the propagation direction of the optical signals in the waveguide core 14 by 180°.

Each bend 20 is characterized by a turning point 52 at which the derivative of a function describing the curvature is equal to zero. Similarly, each bend 24 is characterized by a turning point 54 at which the derivative of a function describing the curvature is equal to zero. The turning points 52 of the bends 20 and turning points 54 of the bends 24 are separated by a gap G of a width dimension that promotes optical coupling in the coupling regions of the structure 10. In an embodiment, the bends 20 may be considered to be convex in curvature and the bends 24 may be considered to be convex in curvature with adjacent turning points 52, 54 for each adjacent pair of bends 20, 24.

The bends 22 may have a width W1 and the bends 20 may have a width W2 that is less than the width W1. The bends 26 may have a width W3 and the bends 24 may have a width W4 that is less than the width W3. In an embodiment, the bends 22 may be joined to the bends 20 by tapers 28 that taper in width dimension from width W1 to width W2, and the bends 26 may be joined to the bends 24 by tapers 30 that taper in width dimension from width W3 to width W4. The tapers 28 may provide phase delay regions that accommodate and compensate for width changes between the bends 20 and the bends 22. The tapers 30 may provide phase delay regions that accommodate and compensate for width changes between the bends 24 and the bends 26. The width compensation provided by the tapers 28, 30 may ensure that the spectrum is unchanged by transitions between waveguide sections of different width dimensions. The taper length L may be chosen for each of the waveguide cores 12, 14 such that that the phase change induced by each is equal.

The waveguide core 16 has a construction similar or identical to the construction of the waveguide core 12 with coupling regions and separation region as described for waveguide core 12. In particular, the waveguide core 16 of the structure 10 include bends 60 that may be similar or identical to the bends 20 of the waveguide core 12 and bends 64 that may be similar or identical to the bends 24 of the waveguide core 12. The waveguide core 18 has a construction similar or identical to the construction of the waveguide core 14 with coupling regions and separation region as described for waveguide core 14. In particular, the waveguide core 18 of the structure 10 include bends that are similar to the bends 24, 26 of the waveguide core 14.

In use as a demultiplexing filter, laser light containing mixed optical signals 32 of different wavelengths (e.g., optical signals 32 of four different wavelengths $\lambda 1, \lambda 2, \lambda 3, \lambda 4$) may be guided on the photonics chip by the waveguide core 12 to the structure 10. The structure 10 may divide the mixed optical signals 32 according to wavelength, and the divided optical signals 33, 34 grouped by wavelength may exit the structure 10 via one of the waveguide cores 12, 14, 16, 18. In the initial stage, optical power of certain wavelengths (e.g., $\lambda 1, \lambda 3$) may be separated from the optical signals 32 and transferred from the waveguide core 12 to the waveguide core 14 for input as optical signals 33 into the subsequent stage including waveguide core 18, while optical power the optical signals 34 of other wavelengths (e.g., $\lambda 2, \lambda 4$) continues to be guided by the waveguide core 12. In the subsequent stages, optical power for the optical signals 33 of a certain wavelength (e.g., $\lambda 2$) may be separated and transferred from the waveguide core 12 to the waveguide core 14, and optical power for the optical signals 34 of a certain wavelength (e.g., $\lambda 1$) may be separated and transferred from the waveguide core 14 to the waveguide core 18. Alternatively, the structure 10 may be used in reverse to multiplex the optical carrier signals of the individual data streams into a combined data stream containing mixed optical signals 32 of different wavelengths.

With reference to FIGS. 6, 7, 7A, 8, 9, 9A and in accordance with embodiments of the invention, a dielectric layer 35 is deposited and planarized relative to the waveguide cores 12, 14, 16, 18 and a dielectric layer 36 is deposited over the dielectric layer 35 to cover the waveguide cores 12, 14, 16, 18. The dielectric layer 35 may be comprised of dielectric material, such as silicon dioxide, that is deposited by chemical vapor deposition and planarized to eliminate topography. The dielectric layer 36 may be comprised of dielectric material, such as silicon dioxide, that is deposited by chemical vapor deposition. The dielectric layer 36 may have a uniform or substantially uniform thickness relative to the top surface of the waveguide cores 12, 14, 16, 18.

Waveguide core regions 40 include bends 42 that formed on the dielectric layer 36 over the bends 20 of the waveguide core 12 in the coupling region of the structure 10, and the waveguide core region 44 includes bends 46 that are formed on the dielectric layer 36 over the bends 22 of the waveguide core 14 in the coupling region of the structure 10. The waveguide core regions 40, 44 may be comprised of a dielectric material, such as silicon nitride, having a different composition different than the composition of the dielectric layer 36. The waveguide core regions 40, 44 may be patterned from a deposited layer of dielectric material by lithography and etching processes. The dielectric layer 36 is positioned in a vertical direction between the bends 42, 46 and the bends 20, 22.

The bends 42 of the waveguide core regions 40, which are disconnected from each other, are positioned over the bends 20 of the waveguide core 12 in an overlapping relationship with the bends 20. In an embodiment, the bends 42 may be centered over the bends 20. Each waveguide core region 40 may extend along a longitudinal axis 66 and may terminate at opposite ends 43 with tapers 48 that are joined to the bend 42. Each waveguide core region 40 is truncated at its respective opposite ends 43 to avoid any overlap of the tapers 48 with the underlying bends 22 of the waveguide core 12. In an embodiment, the tapers 48 may be positioned over, and overlap with, the tapers 28. The change in width dimension or tapering of the tapers 48 along the longitudinal axis 66 of each bend 42 may be the inverse of the change in width dimension of the tapers 28 along the longitudinal axis 21 of the waveguide core 12.

The bends 42 of the waveguide core regions 40 may have a curvature that is similar to the curvature of bends 20. In an embodiment, the bends 42 may have a curvature that is identical or equal to the curvature of bends 20 and, for that reason, have a fully overlapping relationship with the bends 20 of the waveguide core 12. In an alternative embodiment, the bends 42 may have a curvature that is substantially equal to the curvature of the bends 20. In an embodiment, the bends 42 may have a width dimension that is equal to a width dimension of the bends 20. In an alternative embodiment, the bends 42 may have a width dimension that is substantially equal to a width dimension of the curvature of the bends 20. In an embodiment, the bends 42 may have a curved length that is equal to a curved length of the curvature of the bends 20. In an alternative embodiment, the bends 42 may have a curved length that is substantially equal to a curved length of the curvature of the bends 20.

The bends 46 of the waveguide core regions 44, which are disconnected from each other, are positioned over the bends 24 of the waveguide core 14 in an overlapping relationship with the bends 26. In an embodiment, the bends 46 may be centered over the bends 24. Each waveguide core region 44 may extend along a longitudinal axis 68 and may terminate at opposite ends 45 with tapers 50 that are joined to the bend 46. Each waveguide core region 44 is truncated at its respective opposite ends 45 to avoid any overlap of the tapers 50 with the underlying bends 26 of the waveguide core 14. In an embodiment, the tapers 50 may be positioned over, and overlap with, the tapers 30. The change in width dimension or tapering of the tapers 50 along the longitudinal axis 68 of each bend 46 may be the inverse of the change in width dimension of the tapers 30 along the longitudinal axis 25 of the waveguide core 14.

The bends 46 of the waveguide core regions 44 may have a curvature that is similar to the curvature of bends 24. In an embodiment, the bends 46 may have a curvature that is identical or equal to the curvature of bends 24 and, for that reason, have a fully overlapping relationship with the bends 24 of the waveguide core 14. In an alternative embodiment, the bends 46 may have a curvature that is substantially equal to the curvature of the bends 24. In an embodiment, the bends 46 may have a width dimension that is equal to a width dimension of the bends 24. In an alternative embodiment, the bends 46 may have a width dimension that is substantially equal to a width dimension of the curvature of the bends 24. In an embodiment, the bends 46 may have a curved length that is equal to a curved length of the curvature of the bends 24. In an alternative embodiment, the waveguide core regions 44 may have a curved length that is substantially equal to a curved length of the curvature of the bends 24.

Each bend 42 may be characterized by a turning point 56 at which the derivative of a function describing the curvature at the outer radius of the concave shape is equal to zero. Similarly, each bend 46 is characterized by a turning point 58 at which the derivative of a function describing the curvature at the outer radius of the concave shape is equal to zero. In an embodiment, the turning point 56 of each bend 42 may be positioned directly across the gap G from the turning point 58 of one of the bends 46. In an embodiment, the turning point 56 of each bend 42 may be positioned across the gap Gin alignment with the turning point 58 of one of the bends 46. In an embodiment, the turning point 56 of each bend 42 may be located directly above the turning point 52 of one of the bends 20. In an embodiment, the turning point 58 of each bend 46 may be located directly above the turning point 54 of one of the bends 24. The bends 42 are arranged adjacent to the bends 46 with their respective turning points 56, 58 separated by a minimum distance of separation between the bends 42, 46, which in an embodiment may be dimensionally equal to the width dimension of the gap G (FIG. 1). In an embodiment, the bends 42 may be considered to be convex in curvature and the bends 46 may be considered to be convex in curvature with turning points 56, 58 that have adjacent placement for each adjacent pair of bends 42, 46.

The bends 42 of the waveguide core regions 40 over the bends 20 and the bends 46 of the waveguide core regions 44 over the bends 24 provide the coupling regions of the structure 10 with an arrangement of stacked materials of different compositions (e.g., silicon and silicon nitride) to create wavelength-independent couplers. The waveguide core regions 40, 44 permit optical coupling and interactions between the waveguide cores 12, 14 to be tuned, in addition to tuning that may be provided through a selection of the shapes and dimensions of the bends 20, 24. The waveguide core regions 40, 44 may lower confinement and the effective thermo-optic coefficient to make the structure 10 more robust to not only fabrication errors but also to temperature variations.

Waveguide core regions (not shown) similar to waveguide core regions 40, 44 may be positioned over the coupling regions of the waveguide cores 16, 18.

A back-end-of-line stack 70 may be formed by back-end-of-line processing over the waveguide core regions 40, 44. The back-end-of-line stack 70 may include one or more interlayer dielectric layers comprised of one or more dielectric materials, such as a silicon dioxide.

The structure 10, in any of its embodiments described herein, may be integrated into a photonics chip that may include electronic components and additional optical components in addition to the structure 10. The electronic components may include, for example, field-effect transistors that are fabricated by complementary-metal-oxide-semiconductor (CMOS) processing using the device layer of the silicon-on-insulator substrate. The back-end-of-line stack 70 may include metal lines, vias, and contacts that are connected to the field-effect transistors and electrically-active optical components.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a wavelength-division multiplexing filter, the structure comprising:
   a first waveguide core including a first bend having a first curvature and a second bend having a second curvature different than the first curvature; and
   a first waveguide core region including a first end surface, a second end surface, a first taper adjacent to the first end surface, a second taper adjacent to the second end surface, and a bend arranged between the first end surface and the second end surface, the bend positioned over the first bend of the first waveguide core in an overlapping relationship.

2. The structure of claim 1 further comprising:
   a second waveguide core including a first bend having a first curvature and a second bend having a second curvature different than the first curvature, the first bend of the second waveguide core positioned adjacent to the first bend of the first waveguide core, and the first bend of the second waveguide core separated from the first bend of the first waveguide core by a first gap.

3. The structure of claim 2 further comprising:
   a second waveguide core region including a first end surface, a second end surface, and a bend arranged between the first end surface and the second end surface, the bend of the second waveguide core region positioned over the first bend of the second waveguide core in an overlapping relationship.

4. The structure of claim 3 wherein the bend of the first waveguide core region has a first curvature with a first turning point, the bend of the second waveguide core region has a second curvature with a second turning point, and the first turning point is positioned across the first gap in alignment with the second turning point.

5. The structure of claim 3 wherein the bend of the first waveguide core region is centered over the first bend of the first waveguide core, and the bend of the second waveguide core region is centered over the first bend of the second waveguide core.

6. The structure of claim 1 wherein the first waveguide core is comprised of silicon, and the first waveguide core region is comprised of silicon nitride.

7. The structure of claim 1 wherein the bend of the first waveguide core region is centered over the first bend of the first waveguide core.

8. A structure for a wavelength-division multiplexing filter, the structure comprising:
   a first waveguide core including a first bend having a first curvature, a second bend having a second curvature different than the first curvature, and a taper that connects the first bend with the second bend, the first bend of the first waveguide core having a first width, and the second bend of the first waveguide core having a second width that is greater than the first width; and a first waveguide core region including a first end surface, a second end surface, and a bend arranged between the first end surface and the second end surface, the bend positioned over the first bend of the first waveguide core in an overlapping relationship.

9. The structure of claim 1 wherein the first taper terminates the first waveguide core region at the first end surface of the first waveguide core region, and the second taper terminates the first waveguide core region at the second end surface of the first waveguide core region.

10. The structure of claim 1 wherein the first bend of the first waveguide core has a first width, the second bend of the first waveguide core has a second width that is greater than the first width, the first waveguide core includes a taper that connects the first bend with the second bend, and the first taper of the first waveguide core overlaps with the taper of the first waveguide core.

11. The structure of claim 1 further comprising:
a dielectric layer positioned between the first waveguide core and the first waveguide core region.

12. A method of forming a structure for a wavelength-division multiplexing filter, the method comprising:
forming a first waveguide core including a first bend having a first curvature, a second bend having a second curvature different than the first curvature, and a taper that connects the first bend with the second bend; and
forming a first waveguide core region including a first end surface, a second end surface, and a bend arranged between the first end surface and the second end surface,
wherein the bend is positioned over the first bend of the first waveguide core in an overlapping relationship, the first bend of the first waveguide core has a first width, and the second bend of the first waveguide core has a second width that is greater than the first width.

13. The method of claim 12 further comprising:
forming a second waveguide core including a first bend having a first curvature and a second bend having a second curvature different than the first curvature,
wherein the first bend of the second waveguide core is positioned adjacent to the first bend of the first waveguide core and is separated from the first bend of the first waveguide core by a gap.

14. The method of claim 13 further comprising:
forming a second waveguide core region including a first end surface, a second end surface, and a bend arranged between the first end surface and the second end surface,
wherein the bend of the second waveguide core region is positioned over the first bend of the second waveguide core in an overlapping relationship.

15. The method of claim 14 wherein the bend of the first waveguide core region has a first curvature with a first turning point, the bend of the second waveguide core region has a second curvature with a second turning point, and the first turning point is positioned across the gap in alignment with the second turning point.

16. The method of claim 14 wherein the bend of the first waveguide core region is centered over the first bend of the first waveguide core, and the bend of the second waveguide core region is centered over the first bend of the second waveguide core.

17. The method of claim 12 wherein a dielectric layer is positioned between the first waveguide core and the first waveguide core region.

18. The method of claim 12 wherein the first waveguide core region includes a first taper and a second taper, the first taper terminates the first waveguide core region at the first end surface of the first waveguide core region, and the second taper terminates the first waveguide core region at the second end surface of the first waveguide core region.

19. The structure of claim 8 further comprising:
a second waveguide core including a first bend having a first curvature and a second bend having a second curvature different than the first curvature, the first bend of the second waveguide core positioned adjacent to the first bend of the first waveguide core, and the first bend of the second waveguide core separated from the first bend of the first waveguide core by a second gap.

20. The structure of claim 19 further comprising:
a second waveguide core region including a first end surface, a second end surface, and a bend arranged between the first end surface and the second end surface, the bend of the second waveguide core region positioned over the first bend of the second waveguide core in an overlapping relationship.

* * * * *